Jan. 11, 1966 E. A. TAYLOR 3,228,098
APPARATUS FOR ASSEMBLING ROLLING BEARING ELEMENTS
Filed Feb. 17, 1964
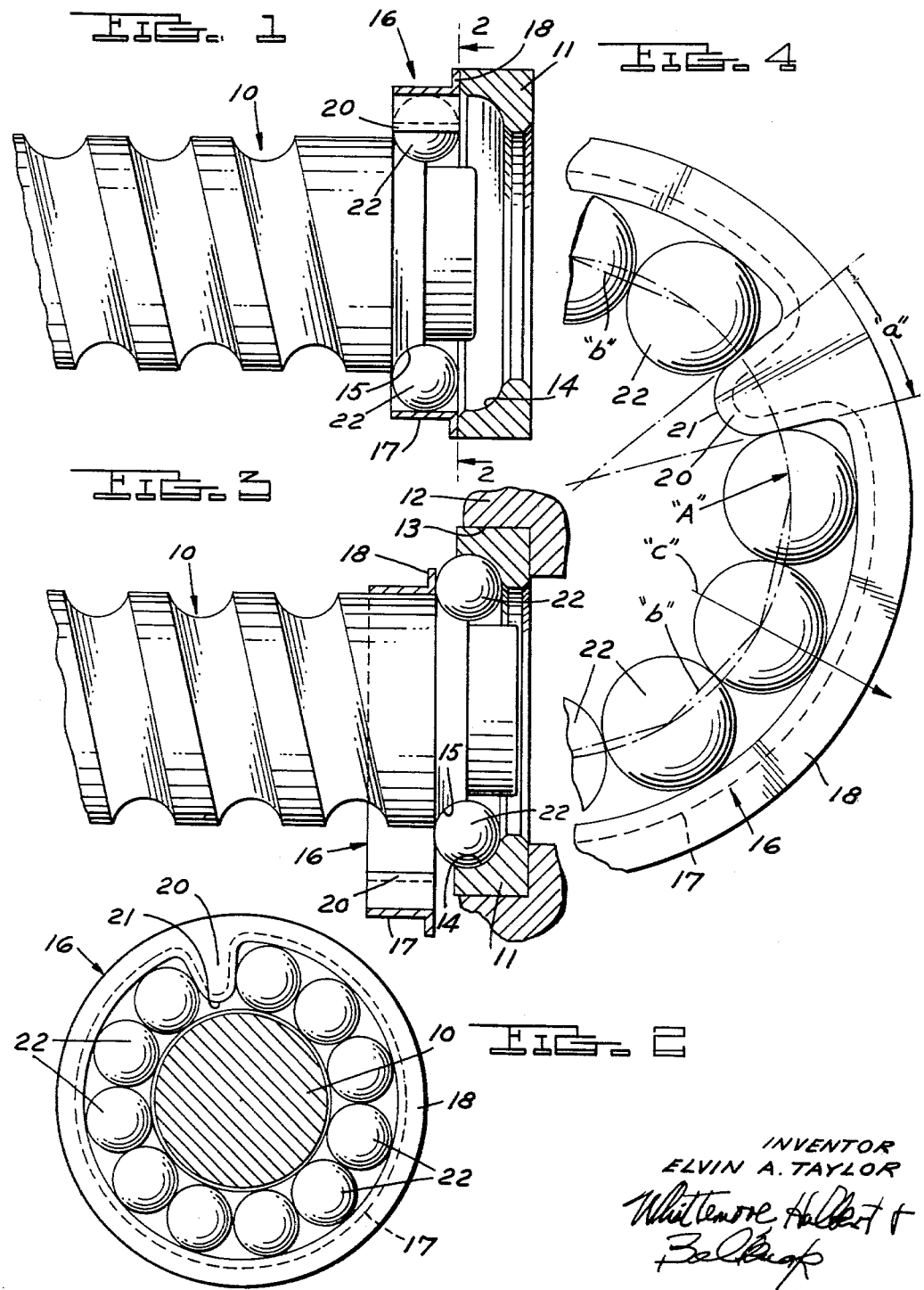
INVENTOR
ELVIN A. TAYLOR
ATTORNEYS United States Patent Office 3,228,098
Patented Jan. 11, 1966

3,228,098
APPARATUS FOR ASSEMBLING ROLLING
BEARING ELEMENTS
Elvin A. Taylor, Plymouth, Mich., assignor to Plymouth
Stamping Company, Plymouth, Mich., a corporation of
Michigan
Filed Feb. 17, 1964, Ser. No. 345,399
9 Claims. (Cl. 29—201)

The present invention relates to improvements in a bearing assembly structure or means for the assembly of bearing balls or equivalent rolling bearing elements between inner and outer, coaxially and radially spaced bearing members of a special type. In particular, the invention pertains to apparatus for the assembly of a circumferential series of bearing balls or rollers between race surfaces, one of which is machined or fixedly formed upon a part which is journaled by the assembled bearing structure, for example an elongated worm of a steering mechanism, such worm being appropriately sustained in a relatively fixed axial relation of its integral race surface to that of a coacting, radially spaced race surface of a structure in which the end of the worm is axially received.

It is an object of the invention to provide bearing assembly means of the sort described which is in the very simple form of an annular retainer for a series of bearing balls or equivalent roller elements, such member or ring being constituted by a relatively thin gauge stamping. This retainer member or ring is formed by stamping to provide an integral wedging formation or projection extending radially inwardly of an internal circumferential retaining surface; and a substantial or major part or number of the series of rolling elements is arranged to extend in a circumferential array between opposite circumferential sides of said wedging abutment or formation.

In this preliminary assemblage of the bearing balls, they are under circumferential compression one against the other in the array referred to, and are confined tightly by the circumferential retaining portion or surface of the annular retainer member. Because of the fact that the latter is of relatively thin character, its retaining portion is outwardly deformed to a slight extent by the wedged-in balls, sufficiently so that the confined array is prevented from unassisted radial inward movement of its component balls, or unassisted axial movement thereof out of the retainer member, pending completion of the operation of finally assembling the series of bearing balls between inner and outer, radially spaced bearing races.

In further accordance with the invention in a bearing assembly structure, a journaled worm or like axially extending member itself provides one of the race surfaces of the bearing, for coaction with another race surface of a structure in which the worm is journaled; and it is by opposite axial forces set up between these race surfaces in the assembly that the series of bearing balls is displaced from the annular ball retainer or ring in an axial direction into a radial plane through the respective race surfaces, with the latter in a finally assembled and radially aligned condition.

For this purpose, the ball retainer ring, in addition to its ball wedging projection, is formed to provide an annular flange or flanged portion extending radially outwardly therefrom, for axial abutting engagement with one of the race members, thus to hold the retainer ring against axial shift, as relative axial movement of the race members toward one another displaces the series of bearing balls from the retainer into final position in the radial plane of the race surfaces.

Further in accordance with the invention, the improved assembly structure has the advantage of being extremely inexpensive, in fact disposable in character, in that the retainer ring, following the completion of assembly as described, is simply left to hang loosely from the worm or other race-bearing element journaled by the completed bearing assembly.

The foregoing as well as other objects will become more apparent as this description proceeds, especially when considered in connection with the accompanying drawings illustrating the invention, wherein:

FIG. 1 is a fragmentary view in longitudinal radial section in a plane through the axis of a worm, the retainer of the invention and a bearing cup adapted to coact with a race surface or formation on the worm, this view showing the parts referred to just prior to completion of the assembly operation;

FIG. 2 is a view in transverse radial section along line 2—2 of FIG. 1, illustrating the retainer as preliminarily loaded with bearing balls;

FIG. 3 is a view similar to FIG. 1, but showing the worm and coacting bearing means as finally assembled with the use of the improved retainer; and FIG. 4 is a fragmentary diagrammatic view showing the geometry of forces arising in rendering the ball and ring pre-assembly self-sustaining prior to final assembling of the ball bearing.

The reference numeral 10 in the figures designates a conventional steel worm which is to be journaled by ball bearing means including an outer race cup 11 within a fixed structure, such as a gear box or casing 12, shown in FIG. 3 as being provided with a cylindrical recess or counterbore 13 in which the race member may be fixedly or relatively rotatively received.

Race member or cup 11 is a standard type, in the form of a machined steel part, adapted to exert a full radial and semi-thrust axial action at its inner circumferential race surface 14 (FIG. 1); and a coacting race surface 15 is formed on worm 10 adjacent an axial end of the latter.

Referring to FIGS. 1 and 2, the ball retainer of the invention, generally designated 16, is formed as a relatively thin-walled stamping of cold rolled steel, having a wall thickness of, say, 0.018 inch. It is provided, about the major portion of its periphery, with an axially extending ball retainer surface 17 of cylindrical outline, this surface extending axially from the inner circumference of a radially outwardly extending abutment flange 18 which, in the use of the assembly, engages axially against the race cup 11 to limit movement of retainer 16 in that direction. The inner diameter of the axially extending retainer surface 17 is shown in FIG. 2 as approximating the maximum inner diameter of the race surface 14 of race cup 11.

Finally, the retainer member or ring 16 is formed to provide an integral wedging formation or extension 20 which projects radially inwardly from the retaining surface 17, the wedging formation having a rounded inner nose 21. The circumferential width of the wedging element or formation 20 is closely interrelated to the number and diameter of a circumferential series of bearing balls 22 (shown as eleven in number), as will appear.

Thus, in using the retainer 16 the retainer is placed on a flat surface with its flange 18 up and paralleling that surface. Then the intended number of predeterminedly dimensioned balls or rolling elements 22 are placed within the retaining surface or portion 17 of ring 16; and the proportioning of the parts, including the inner diameter of surface 17, the balls 22 and wedging projection or formation 20 is such that this placement is finally accomplished only under axial force on the last ball to be placed. As the result, the annular array of balls 22 extending from opposite circumferential sides of the wedging element 20 are placed under substantial circumferential compression between the sides of the last named formation, and are also thrust radially outwardly under relatively strong force against circumferential wedging surface or portion 17. The forces are akin to those of a keystone arch structure; and the relatively thin nature of retainer 16 permits its axial retaining portion to be slightly deformed outwardly by the balls 22. Thus the latter are restrained against unassisted axial movement relative to the surface, as well as unassisted radial inward movement from said surface.

With the balls thus assembled to the retainer, such assembly is placed with its balls engaging the race surfaces 15 of worm 10, and is then approached by axial movement of the latter toward the adjacent annular surface of bearing cup 11. This may take place before or after that cup has been relatively loosely or tightly mounted within the counterbore 13 of the journaling structure 12. The flange 18 axially engages the race member 11.

Continued axial approach of worm 20 in the direction referred to causes its race surface 15 to forcefully displace the balls 22 out of their circumferentially and radially outwardly confined condition within retaining surface 17, and into the race surface 14. Worm 10 follows, until its end is telescoped within race cup 11, with the series of balls occupying a radial plane common to the axially assembled race surfaces 14 and 15. This completes the intended assembly, whereupon retainer ring 16 drops loosely away from the balls and hangs suspended, as shown in FIG. 3, by the worm 10. Such worms are usually of a hard steel, well capable of withstanding the very slight wear of the retainer in this loose condition.

FIG. 4 of the drawings shows the geometry of the circumferential and radial forces which arise in the preliminary assembly of the balls 22 to the retainer 16, prior to final assembly of the balls from the retainer and between race surfaces 14, 15. It is seen that the axial force attending placement of the last ball of the array of balls extending from opposite sides of the wedging projection or formation 20, such array extending along an arc "A," results in forces rendering the pre-assembly self-sustaining against axial and radially inward separation of the balls from ring 16. Thus, assuming that the wedging and retaining formation 20 is desiredly designed to engage adjacent balls of the formation at an attack angle "$a$," the result is that circumferential compression exists between successive balls on theoretical lines "$b$" connecting their respective centers, which lines individually subtend portions of the circumferential arc "A" as chords of the latter. Consequently, individual, radially outwardly acting force components are exerted on the balls 20 along vector lines "$c$," which have the effect of maintaining the balls against the retainer surface 17 under force sufficient to prevent unassisted radially inward movement from the surface 17. As indicated above, these forces act to locally indent the axial retainer surface 17 ever so slightly, thus preventing unassisted axial displacement of the balls 22 from retainer 16 prior to final assembly of the bearing structure.

Structurally speaking, the retainer 16 is of very inexpensive, thin stamped metal construction, making possible its disposal, in effect, after a single use. Procedurally speaking, the operations of assembling the balls to retainer 16 and of completing the assembly of the balls from the ring to and between the race surfaces, using one race-bearing component as a part of the assembly equipment, are exceedingly quickly and easily performed by inexperienced or unskilled personnel.

What I claim as my invention is:

1. Structure for the assembly of a circumferential series of rolling bearing elements between the coaxial circumferentially extending race surfaces of a pair of coaxial, radially spaced, inner and outer bearing race members, comprising an annular member having a circumferential element retaining portion extending axially thereof, said retaining portion being formed to provide an integral, radially inwardly projecting wedging element of relatively slight circumferential extent which is directly engageable between and against rolling surfaces of adjacent elements of the circumferential series, as arranged within said retaining portion, to urge said elements circumferentially against one another, at contacting portions of said rolling surfaces radially inwardly of the rolling axes thereof, and radially outwardly against said retaining portion under force sufficient to prevent unassisted radially inward movement of the elements away from said retaining portion, said elements being engageable under axial compression between said coaxial race members under axial force attending relative axial movement of the latter to axially shift and dispose said elements out of said annular member and in operative rolling position between said race surfaces.

2. Structure for the assembly of a circumferential series of rolling bearing elements between the coaxial circumferentially extending race surfaces of a pair of coaxial, radially spaced, inner and outer bearing race members, comprising an annular member of relatively thin sheet metal having a circumferential element retaining portion extending axially thereof, said retaining portion being formed to provide an integral, radially inwardly projecting wedging element of relatively slight circumferential extent which is directly engageable between and against rolling surfaces of adjacent elements of the circumferential series, as arranged within said retaining portion, to urge said elements circumferentially against one another, at contacting portions of said rolling surfaces radially inwardly of the rolling axes thereof, and radially outwardly against said retaining portion under force sufficient to prevent unassisted radially inward movement of the elements away from said retaining portion, said elements being engageable under axial compression between said coaxial race members under axial force attending relative axial movement of the latter to axially shift and dispose said elements out of said annular member and in operable rolling position between said race surfaces, the inner diameter of said retaining portion substantially equaling the maximum inner diameter of the outer race member.

3. Structure for the assembly of a circumferential series of rolling bearing balls between the coaxial circumferentially extending race surfaces of a pair of coaxial, radially spaced, inner and outer bearing race members, comprising an annular member of relatively thin sheet metal having a circumferential ball retaining portion extending axially thereof, said retaining portion being formed to provide an integral, radially inwardly projecting wedging element of relatively slight circumferential extent which is directly engageable between and against rolling surfaces of adjacent balls of the circumferential series, as arranged within said retaining portion, to urge said balls circumferentially against one another, at contacting portions of said rolling surfaces radially inwardly of the rolling axes thereof, and radially outwardly against said retaining portion under force sufficient to prevent unassisted radially inward movement of the balls away from said retaining portion, said balls being engageable under axial compression between said coaxial race members under axial force attending relative axial movement of the latter to axially shift and dispose said balls out of said annular member and in operative rolling position between said race surfaces, the inner diameter of said retaining portion substantially equaling the maximm inner diameter of the outer race member.

4. Structure for the assembly of a circumferential series of rolling bearing elements between the coaxial circumferentially extending race surfaces of a pair of coaxial, radially space, inner and outer bearing race members, comprising an annular member of relatively thin sheet metal having a flanged portion at one end thereof, and a circumferential element retaining portion extending axially from said flanged portion, said retaining portion being formed to provide an integral, radially inwardly extending wedging element of relatively slight circumferential extent directly engageable between and against rolling surfaces of adjacent elements of the circumferential series, as arranged within said retaining portion, to urge said elements circumferentially against one another, at contacting portions of said rolling surfaces radially inwardly of the rolling axes thereof, and radially outwardly against said retaining portion under force sufficient to prevent unassisted radially inward movement of the elements away from said retaining portion, said elements being engaged under axial compression between said coaxial race members under axial force attending relative axial movement of the latter to axially shift and dispose said elements out of said annular member and in operative rolling position between said race surfaces, said flanged portion of said annular member being axially engageable with the outer race member as an abutment to prevent axial movement of said annular member relative to said outer member under axial force.

5. Structure for the assembly of a circumferential series of rolling bearing balls between the coaxial circumferentially extending race surfaces of a pair of coaxial, radially spaced, inner and outer bearing race members, comprising an annular member of relatively thin sheet metal having a radially outwardly extending peripheral flange at one end thereof, and a circumferential ball retaining portion extending axially from said flange, said retaining portion being formed to provide an integral, radially inwardly extending wedging element of relatively slight circumferential extent directly engageable between and against rolling surfaces of adjacent balls of the circumferential series, as arranged within said retaining portion, to urge said balls circumferentially against one another, at contacting portions of said rolling surfaces radially inwardly of the rolling axes thereof, and radially outwardly against said retaining portion under force sufficient to prevent unassisted radially inward movement of the elements away from said retaining portion, said balls being engaged under axial compression between said coaxial race members under axial force attending relative axial movement of the latter to axially shift and dispose said balls out of said annular member and in operative rolling position between said race surfaces, said peripheral flange of said annular member being axially engageable with the outer member as an abutment to prevent axial movement of said annular member relative to said outer member under said axial force, the inner diameter of said retaining portion substantially equaling the maximum inner diameter of the outer race member.

6. Structure for the assembly of a circumferential series of rolling bearing elements between the coaxial circumferentially extending race surfaces of a pair of coaxial, radially spaced, inner and outer bearing race members, comprising an annular member having a circumferential element retaining portion extending axially thereof, said retaining portion being formed to provide an integral, radially inwardly projecting wedging element of relatively slight circumferential extent which is directly engageable between and against rolling surfaces of adjacent elements of the circumferential series, as arranged within said retaining portion, to urge said elements circumferentially against one another, at contacting portions of said rolling surfaces radially inwardly of the rolling axes thereof, and radially outwardly against said retaining portion under force sufficient to prevent unassisted radially inward movement of the elements away from said retaining portion, said elements being engageable under axial compression between said coaxial race members under axial force attending relative axial movement of the latter to axially shift and dispose said elements out of said annular member and in operative rolling position between said race surfaces, said retainer portion being of sufficiently small thickness to be radially outwardly deformed slightly by said bearing elements under radially outward force exerted by the latter on the retainer portion, thus to prevent unassisted axial displacement of the bearing elements from the retainer portion prior to final dispostion of said elements between said race surfaces.

7. Structure for the assembly of a circumferential series of rolling bearing balls between the coaxial circumferentially extending race surfaces of a pair of coaxial, radially spaced, inner and outer bearing race members, comprising an annular member of relatively thin sheet metal having a radially outwardly extending peripheral flange at one end thereof, and a circumferential ball retaining portion extending axially from said flange, said retaining portion being formed to provide an integral, radially inwardly extending wedging element of relatively slight circumferential extent directly engageable between and against rolling surfaces of adjacent balls of the circumferential series, as arranged within said retaining portion, to urge said balls circumferentially against one another, at contacting portions of said rolling surfaces radially inwardly of the rolling axes thereof, and radially outwardly against said retaining portion under force sufficient to prevent unassisted radially inward movement of the elements away from said retaining portion, said balls being engaged under axial compression between said coaxial race members under axial force attending relative axial movement of the latter to axially shift and dispose said balls out of said annular member and in operative rolling position between said race surfaces, said peripheral flange of said annular member being axially engageable with the outer member as an abutment to prevent axial movement of said annular member relative to said outer member under said axial force, the inner diameter of said retaining portion substantially equaling the maximum inner diameter of the outer race member, said retainer portion being of sufficiently small thickness to be radially outwardly deformed slightly by said bearing balls under radially outward force exerted by the latter on the retainer portion, thus to prevent unassisted axial displacement of the bearing balls from the retainer portion prior to final disposition of said balls between said race surfaces.

8. Structure for the assembly of a circumferential series of rolling bearing elements between coaxial, circumferentially extending race surfaces, comprising an annular element-retaining member having a radially projecting element of relatively slight circumferential extent which is directly engageable between and against rolling surfaces of adjacent bearing elements of the circumferential series, as arranged within said retaining member, at contacting portions of said rolling surfaces radially inwardly of the rolling axes thereof, to urge said bearing elements circumferentially against one another and radially against said retaining member.

9. Structure for the assembly of a circumferential series of rolling bearing elements between coaxial, circumferentially extending race surfaces, comprising an annular element-retaining member having a radially inwardly projecting wedging element of relatively slight circumferential extent which is directly engageable between and against rolling surfaces of adjacent bearing elements of the circumferential series, as arranged within said retaining member, at contacting portions of said rolling surfaces radially inwardly of the rolling axes thereof, to urge said bearing elements circumferentially against one another and radially outwardly against said retaining member under wedging force sufficient to prevent unassisted radially inward movement of the elements away from said retaining member.

References Cited by the Examiner

UNITED STATES PATENTS

| | | | |
|---|---|---|---|
| 619,484 | 2/1899 | Hofgrefe | 29—201 |
| 1,517,574 | 12/1924 | Morrison | 29—201 |
| 1,533,746 | 4/1925 | Lott | 29—148.4 |
| 1,840,638 | 1/1932 | Scribner | 29—148.4 |
| 2,312,615 | 3/1943 | Allen | 29—201 X |
| 2,931,095 | 4/1960 | Esken | 29—201 |
| 3,116,543 | 1/1964 | Schoos | 29—201 |

WHITMORE A. WILTZ, *Primary Examiner.*

THOMAS H. EAGER, *Examiner.*